United States Patent
Montgomery

[15] 3,654,979
[45] Apr. 11, 1972

[54] CARVING BOARD ATTACHMENT FOR PLATTER

[72] Inventor: Raymond A. Montgomery, North Racebrook Road, Woodbridge, Conn. 06525

[22] Filed: Sept. 24, 1970

[21] Appl. No.: 75,069

[52] U.S. Cl. ................................................146/215
[51] Int. Cl. ..................................................A47j 43/18
[58] Field of Search ..........................146/215; 269/289

[56] References Cited

UNITED STATES PATENTS 1,527,766  2/1925  Wellman et al. ...................146/215
3,106,236  10/1963  Brady ....................................146/215

FOREIGN PATENTS OR APPLICATIONS 2,919    1874    Great Britain ...................145/215
165,617  7/1921  Great Britain ...................146/215
262,205  12/1926 Great Britain ...................146/215
12,437   5/1933  Australia .........................146/215

Primary Examiner—Willie G. Abercrombie
Attorney—Dallett Hoopes

[57] ABSTRACT

Carving board attachment has flat upper and lower faces for easy use, cleaning, and storage. Outward hooks hold it firmly in place on a serving platter.

5 Claims, 5 Drawing Figures

PATENTED APR 11 1972  3,654,979
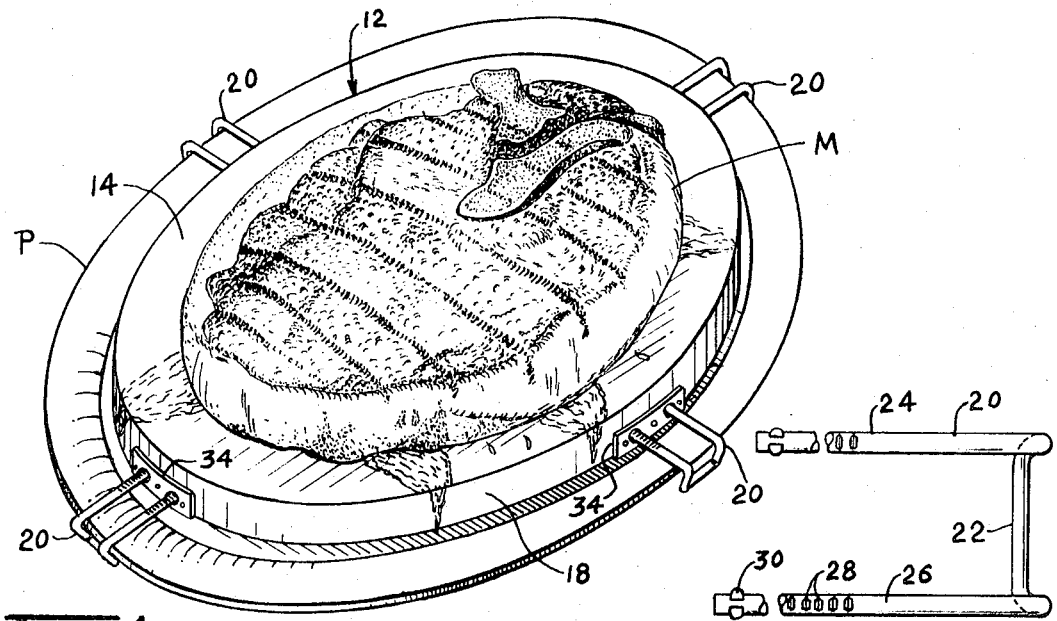
Fig.1.
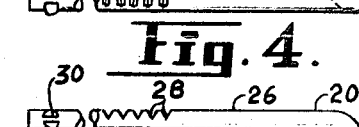
Fig.4.
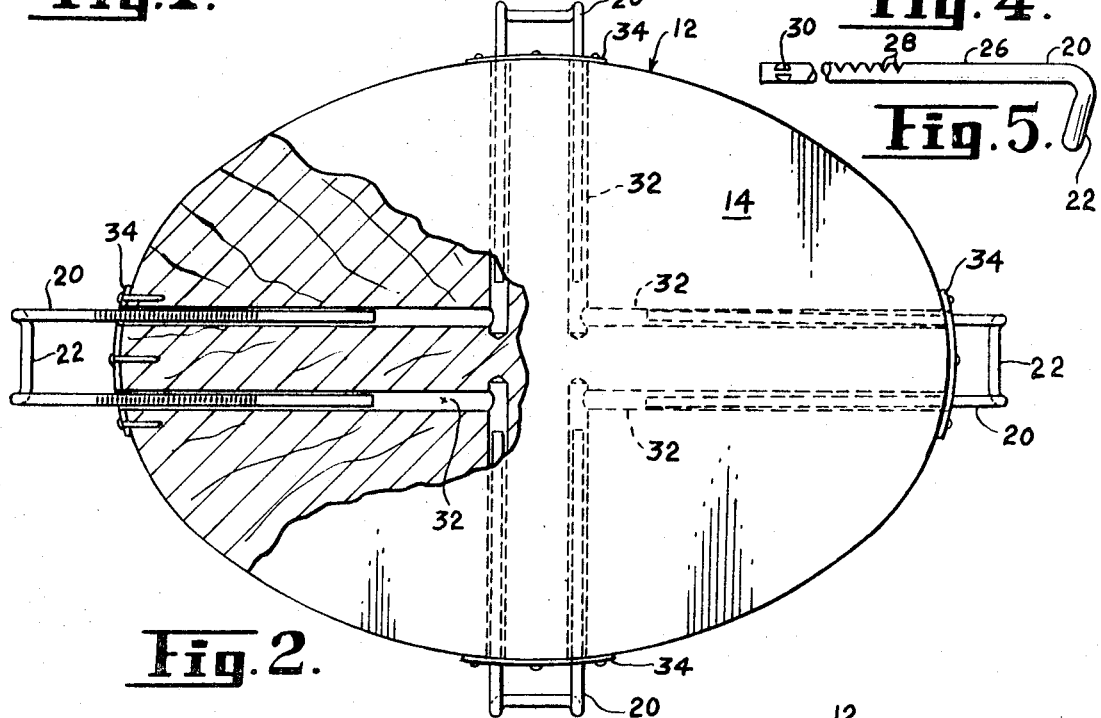
Fig.5.
Fig.2.
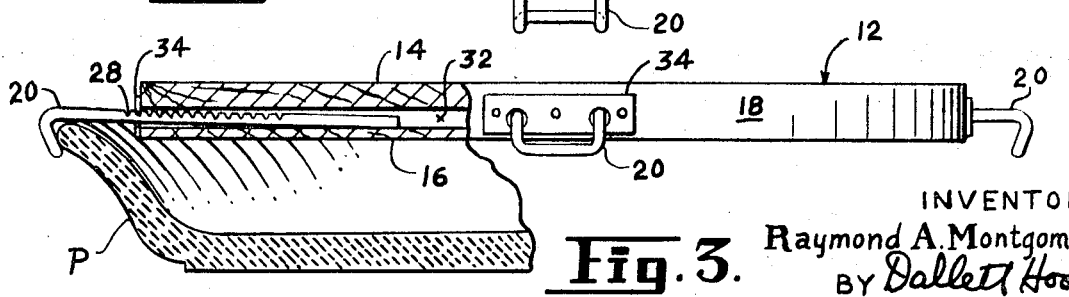
Fig.3.
INVENTOR
Raymond A. Montgomery
BY Dallett Hoopes
ATTORNEY

CARVING BOARD ATTACHMENT FOR PLATTER

This invention relates to a carving board. More specifically, this invention relates to a board adapted to be positioned on, and used with, a conventional ceramic or metal serving or carving platter.

The prior art reveals many carving boards for meat, fowl, and the like, most of which are flat boards often of composite wood construction. Such boards are usually not provided with drip-catching means and hence their use in the dining room has resulted in dripping on the tablecloth and general messiness. Moreover, their functional appearance has not been in keeping with the more formal decor of the dining room. These boards have therefore generally been relegated to the kitchen, and because of the inconvenience involved in the use of such a board in the kitchen rather than at the serving location, they have been stored away and often not used.

The prior art has also shown platter attachments designed for holding the meat or fowl during the carving operation. Examples are the structures shown in U.S. Pat. No. 1,471,122 and British Pat. No. 165,617 (1921). Such attachments, however, have not presented smooth, flat, cutting surfaces and were objectionable for their inclusion of many projections and shapes on their faces actually impeding their use as a carving board. Such projections have also made them difficult to clean and store.

It is an object of the present invention to provide a carving board for attachment to a conventional platter to thereby provide juice-catching means for the board as well as appearance matching that of the more usual dining room containers.

It is a further object to provide a carving board with means to fix its location on its platter and providing a smooth surface for effective use and easy cleaning and storage.

Other objects of the invention will be apparent from the following specification including the drawings, all of which disclose and describe a non-limiting form of the invention. In the drawings:

FIG. 1 is a perspective view showing a board in use and installed on a serving platter;

FIG. 2 is a top view with a surface portion broken away to reveal the arrangement of the hook means;

FIG. 3 is a fragmentary elevation, partly in section; showing the device installed on a serving platter;

FIG. 4 is an enlarged broken top plan view of a hook comprising part of the device; and FIG. 5 is a broken side view of a hook comprising part of the device.

Referring more specifically to the drawings, a board 12 embodying the invention and installed on a conventional serving platter P is shown in FIG. 1. The board 12 is oval in shape and presents generally smooth and flat upper and lower faces 14 and 16 (FIG. 3). A peripheral face 18 defines the rim of the board.

Disposed about the peripheral face of the board are a plurality of hooks 20. Each of the hooks is preferably of spring steel and is a generally U-shaped rod element having a bight portion 22 and parallel leg runs 24, 26. The bight portion 22 is offset, as shown in FIG. 5, downward from the plane of the leg runs 24 and 26 to provide a hooking end. The hooking ends may be rubber coated to enhance frictional engagement with the platter. At least one of the legs is provided with a series of notches 28. Ears 30 may be formed adjacent the end of one of the legs to provide stop means.

Recess means 32 are provided in the board for each hook. Preferably, the recess means each comprise a pair of parallel bores extending toward the center of the board from the peripheral face and receiving respectively the leg runs 24 and 26 of one of the hooks so that the hooks may slide in and out of the recess means at the same time being laterally secure with respect to the board. Preferably, the leg runs in manufacture may be sprung slightly outward to make more firm their engagement with the board in the holes (see right-hand side of FIG. 2).

Over each recess means 32, a metal framing plate 34 is secured to the peripheral face 18 by nails or the like. The plate presents openings in alignment with the holes of the recess means 32. Preferably, the openings are somewhat smaller in diameter than the holes so that a selected notch 28 can engage the plate at the opening. This engagement locks the hook releaseably against in-and-out movement with respect to the board. Preferably, the notches 28 are in the top of a leg run 26 so that the weight of the board and the meat M thereon serve to hold the framing plate 34 more forcefully in engagement with the notch 28. Stop means 30 engage the inside of plate 34 to limit the outward travel of the hook.

In use, the board is positioned in the center of a platter P and the hooks 20 are brought out and then pressed inwardly until they make a firm engagement with the rim of the platter. The locking of each of the framing plates 34 into the notches 28 thereunder then precludes lateral shifting of the board 12 with respect to platter P.

Obviously, the disposition of the underface 16 of the board 12 with respect to the platter P will be governed by the shape of the platter. If the platter is extremely shallow, for instance, the bottom of the board 16 may rest thereon. In other cases, the board 12 may be suspended above the floor of the platter P by the hooks 20 as shown. It will be noted that in the embodiment shown, the bores for the hooks 20 lie closer to the surface 16 than surface 14. This enables the hooks to be drawn out and inverted, reinserted and the entire board to be inverted to achieve adjustment of the height of the upper and lower surfaces of the board with respect to the bottom of the platter. In embodiments in which this feature is employed, the ears 30 are not used on the leg runs (FIG. 2).

Preferably, the board 12 is of some hard wood such as maple or oak, although it could be molded from any rough, durable plastic and decorated, for instance, to present a wood-like appearance. A smooth, flat, surface is required for easiest carving.

It will be clear that the board 12 holds the meat M above the platter rim where the meat can be readily cut with a knife without interference of the knife with the rim. Because the board is of lesser dimension than the platter, juices from the meat draining off the board 12 will drain into the platter. The platter gives the assembly an appropriate appearance for the dining room table.

Obviously, the shape of the board may be redesigned as desired. Other reasonable variations of the invention are envisioned, all within the scope of the following claim language:

I claim:

1. A carving board for use with a serving platter and comprising a flat body of wood or the like presenting substantially smooth faces on the upper and under sides thereof and having spaced about its peripheral face a plurality of hooks adapted to engage over the rim of such platter to hold the board fixed in relation thereto, each of the hooks comprising a generally U-shaped rod element having a bight portion and parallel leg runs, the bight portion being offset downward from the plane of the leg runs to provide a hooking end, the board being formed with a plurality of recess means in the peripheral face to slidingly receive the leg runs of the hooks so that each hook may be extended outward from the board to a selected length.

2. A carving board as described in claim 1 wherein the recess means comprise for each hook a pair of parallel holes and a framing plate is secured over each pair of holes, the plate having a pair of openings in alignment with the holes respectively, and the leg runs of the hook extend through the openings in the plate and into the holes.

3. A carving board as described in claim 2 wherein the diameter of the openings in the plate is less than the diameter of the holes and one of the leg runs is notched to cooperate with the framing plate in releasably setting the position of the hook relative to the board.

4. A carving board as described in claim 1 wherein the board is oval in shape.

5. A carving board as described in claim 2 wherein the holes lie closer to one of the upper and under sides of the body than the other.

* * * * *